United States Patent [19]

Mottate

[11] Patent Number: 4,701,058
[45] Date of Patent: Oct. 20, 1987

[54] STOPPER MECHANISM OF A LINEAR MOTION ROLLING CONTACT BEARING ASSEMBLY

[75] Inventor: Tatsuo Mottate, Mitaka, Japan

[73] Assignee: Nippon Thompson Co., Ltd., Tokyo, Japan

[21] Appl. No.: 898,469

[22] Filed: Aug. 20, 1986

[30] Foreign Application Priority Data

Aug. 23, 1985 [JP] Japan ............................ 60-127851[U]

[51] Int. Cl.⁴ ........................ F16C 29/06; F16C 29/04
[52] U.S. Cl. ......................................... 384/45; 384/49
[58] Field of Search ................... 384/7, 18, 19, 21, 34, 384/43, 45, 49, 50; 312/348

[56] References Cited

U.S. PATENT DOCUMENTS

| 2,889,181 | 6/1959 | Lang et al. | 384/45 |
| 3,078,131 | 2/1963 | Beeck | 384/19 |
| 3,328,107 | 6/1967 | Gutner | 384/19 X |
| 3,904,254 | 9/1975 | Hager et al. | 312/348 X |
| 4,183,596 | 1/1980 | Greene | 312/348 X |
| 4,252,382 | 2/1981 | Thomas | 384/18 |
| 4,593,957 | 6/1986 | Hidaro | 384/49 |
| 4,611,861 | 9/1986 | Haruyama | 384/18 X |
| 4,616,885 | 10/1986 | Komiya | 384/49 X |

FOREIGN PATENT DOCUMENTS 1302026  1/1973  United Kingdom .................. 384/43

Primary Examiner—Stuart S. Levy
Assistant Examiner—Thomas R. Hannon
Attorney, Agent, or Firm—Alan H. MacPherson; Paul J. Winters; Kenneth E. Leeds

[57] ABSTRACT

A linear motion rolling contact bearing assembly including a rail, a slider and a plurality of rolling members interposed between the rail and the slider for providing a rolling contact therebetween is provided. The rail includes a bottom wall and a pair of side walls extending upward from the opposite sides of the bottom wall, so that the rail has a U-shaped cross section. The slider includes a frame which is comprised of a top wall and a pair of side walls depending from the opposite sides of the top wall, so that the frame has a U-shaped cross section. Each of the side walls is provided with a guide groove so that the rolling members are interposed between the rail and the slider as partly fitted in a pair of associated guide grooves. The rail is provided with a stopper at each end thereof, and the side walls of the frame extend sufficiently downward so that their bottom ends are engageable with the stopper when the slider has moved to an extreme end of the rail, so that the slider is prevented from slipping away from the rail.

11 Claims, 5 Drawing Figures

STOPPER MECHANISM OF A LINEAR MOTION ROLLING CONTACT BEARING ASSEMBLY

BACKGROUND OF THE INVENTION

1. Field of the Invention

This invention generally relates to a bearing assembly for providing a linear motion between two elements, and, in particular, to a stopper mechanism between the two moving elements of a linear motion rolling contact bearing assembly.

2. Description of the Prior Art

A linear motion rolling contact bearing assembly is well known in the art, and it generally includes a rail extending straight over a predetermined length and a slider which slidingly moves along the rail. A plurality of rolling members, such as balls or rollers, are provided between the rail and the slider to provide a rolling contact between the rail and the slider. For this purpose, each of the rail and the slider is provided with a guide groove in which the rolling members are partly fitted. In one embodiment, an endless circulating path may be defined in the slider, in which case the slider may slidingly move along the rail as far as the rail extends. In another embodiment, the rolling members are disposed just between the rail and the slider and no endless circulating path is provided.

In such linear motion rolling contact bearing assemblies, the movement of the slider relative to the rail is mainly limited by the length of the rail and there must be provided means for preventing the slider from slipping away from the rail at each end thereof. Otherwise, the slider may be disengaged from the rail and, in some cases, the rolling members may fall out.

SUMMARY OF THE INVENTION

In accordance with the present invention, there is provided a linear motion rolling contact bearing assembly which comprises a rail, a slider which moves along the rail, and a plurality of rolling members interposed between the rail and the slider. The rail is formed to have a U-shaped cross section and thus it includes a bottom wall and a pair of side walls extending upward from the respective sides of the bottom wall. The rail is preferably formed from a thin steel plate by bending. In the present invention, the rail is provided with a stopper at each end thereof. In one embodiment, the stopper is formed integrally with the rail, and in another embodiment, the stopper is formed from a block which is fixedly attached to the corresponding end of the rail. Preferably, the integrally formed stopper is formed by bending an end portion of the bottom wall of the rail. Similarly, the separate stopper is fixedly attached to the bottom wall of the rail at each end thereof.

The slider includes a frame which also has a U-shaped cross section, so that the frame includes a top wall and a pair of side walls depending from the opposite sides of the top wall. Thus, the frame of the slider, in effect, has a cross section of an inverted-V, and its width or sidewise dimension is slightly smaller than the distance between the two inner opposite surfaces of the pair of side walls of the rail. Accordingly, the slider is fitted in the trough-shaped space defined by the rail. In one embodiment, the slider further includes a main body in which a pair of endless circulating paths is defined. A plurality of rolling members, balls or rollers, are provided in each of the endless circulating paths. Each of the endless circulating paths includes a load section defined between the rail and the slider, a return section and a pair of connecting sections each connecting the corresponding ends of the load and return sections. The rail is provided with a pair of outer guide grooves each provided at the inner surface of the corresponding one of the pair of side walls of the rail. Similarly, the frame is provided with a pair of inner guide grooves each provided at the outer surface of the corresponding one of the pair of side walls of the frame. In another embodiment, a retainer plate is inserted between the associated side walls of the rail and the frame. The retainer plate retains a plurality of rolling members interposed between the rail and the slider.

The frame of the slider is so formed that each of its side walls extends closer to the bottom wall of the rail when assembled so that the bottom ends of the side walls of the frame can come into engagement with the stopper of the rail at an extreme end of the rail, thereby preventing the slider from slipping away from the rail. In this manner, in accordance with the present invention, a stopper mechanism between the rail and the slider is defined by the stopper provided at each end of the rail and the bottom ends of the frame of the slider, so that the stopper mechanism can withstand a relatively large force.

It is therefore a primary object of the present invention to obviate the disadvantages of the prior art as described above and to provide an improved linear motion rolling contact bearing assembly.

Another object of the present invention is to provide an improved stopper mechanism between the rail and the slider of a linear motion rolling contact bearing assembly.

A further object of the present invention is to provide a linear motion rolling contact bearing assembly high in performance, sturdy in structure, and easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
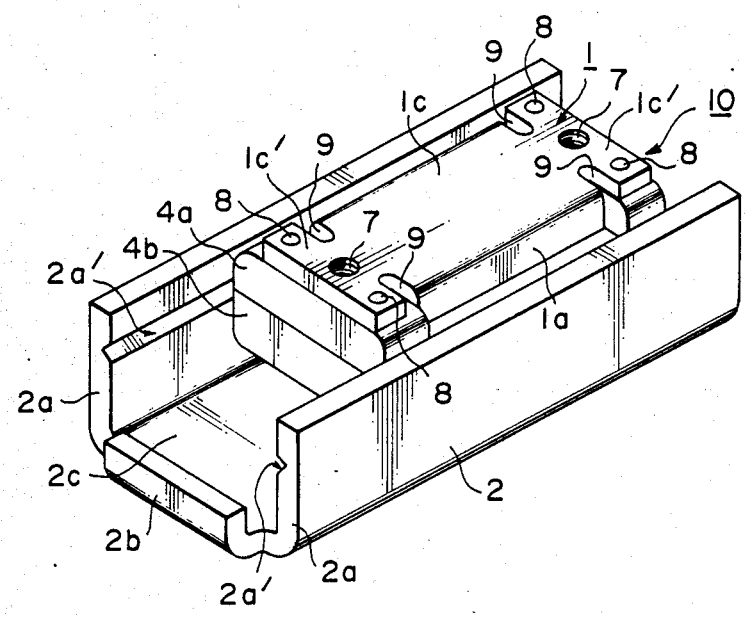
FIG. 1 is a perspective view showing a linear motion rolling contact bearing assembly constructed in accordance with one embodiment of the present invention.
Figure 2:
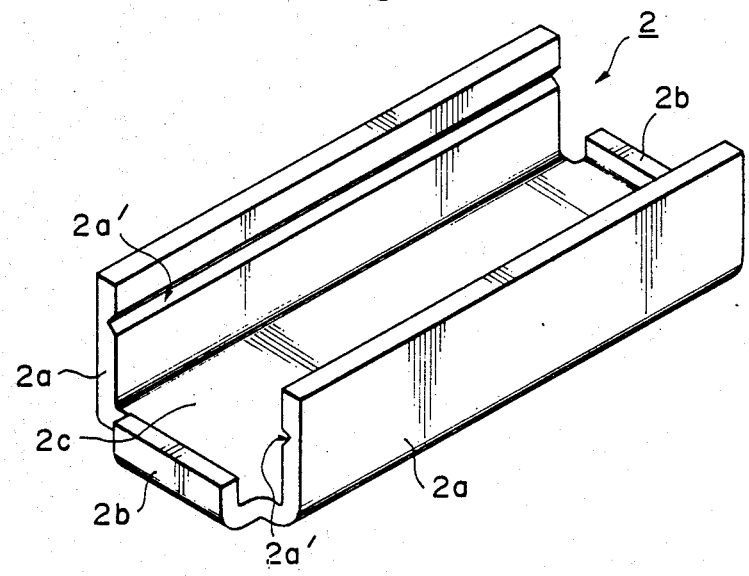
FIG. 2 is a perspective view showing in detail the structure of the rail forming part of the bearing assembly shown in FIG. 1.

Referring now to FIG. 1, there is schematically shown a linear motion rolling contact bearing assembly constructed in accordance with one embodiment of the present invention. As also shown in FIG. 2, the bearing assembly includes a rail 2 which extends straight over a predetermined length along its longitudinal direction and which has a flat bottom wall 2c and a pair of side walls 2a, 2a extending upright from opposite sides of the bottom wall 2c. Thus, the rail 2 has a U-shaped cross section with its open end located at the top. Preferably, the rail 2 is formed from a thin steel plate by bending. Each of the side walls 2a, 2a is provided with an outer guide groove 2a' which is engraved at the inner surface of the side wall 2a and extends in parallel with the longitudinal direction of the rail 2. A stopper 2b is provided at each end of the rail 2, and, in the illustrated embodiment, the stopper 2b is formed integrally with the rail 2 by bending an end portion of the bottom wall 2b upwardly. Thus, the stopper 2b, in effect, has an L-shaped cross section when viewed in the transverse direction.

Figure 3:
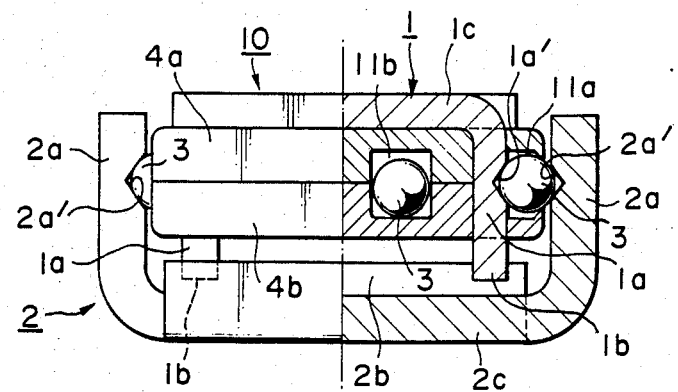
FIG. 3 is an end view showing partly in cross section the bearing assembly shown in FIG. 1.

As shown in FIGS. 1 and 3, the linear motion rolling contact bearing assembly further includes a slider 10 which is disposed inside of the space defined by the rail 2 so as to be slidingly movable therealong. The slider 10 includes a frame 1 and a main body which is comprised of upper block 4a and lower block 4b and held by the frame 1 and provided with a pair of endless circulating paths. The frame 1 includes a flat top wall 1c and a pair of side walls 1a, 1a depending straight downwardly from the opposite sides of the top wall 1c. Accordingly, the frame 1 also has a U-shaped cross section, but in this case the open end is located at the bottom, so that the frame 1 has a cross section of an inverted-U with respect to the rail 1. The frame 1 is also provided with a mounting section 1c' at each end of the top wall 1c. The mounting section 1c' is defined by forming a pair of opposite notches 9, 9. In the illustrated example, the mounting section 1c' is provided with a mounting hole 7 for mounting the slider 10 to an external member, for example by means of a bolt, and a pair of rivet holes 8, 8 for fixing the main body to the frame 1. As shown in FIG. 3, an inner guide groove 1a' is formed at the outer surface of each of the side walls 1a, 1a of the frame. These inner guide grooves 1a', 1a' extend straight and in parallel with the outer guide grooves 2a', 2a'. Preferably, the frame 1 is formed by suitably bending a thin steel plate after stamping.

As best shown in FIG. 3, it should be noted that the side walls 1a, 1a of the frame 1 extend sufficiently in the downward direction and their tip ends 1b, 1b are located close to the bottom wall 2c of the rail 2. In other words, the side walls of the frame 1 of the slider 10 should be long enough to come into engagement with one of the stoppers 2b, 2b when the slider 10 has moved to one extreme end of the rail 2, thereby preventing the slider 10 from slipping away from the rail 2. Thus, a stopper mechanism between the rail 2 and the slider 10 is formed by the stoppers 2b, 2b of the rail 2 and the bottom ends 1b, 1b of the side walls 1a, 1a of the frame 1. Such a stopper mechanism is advantageous because a secure stop function may be provided at each end of the rail 2 to withstand a relatively large force.

The slider 10 also includes the main body which is fixedly attached to the frame 1 by means of rivets in the illustrated example. The main body is comprised of an upper block 4a and a lower block 4b which are identical in structure and which are preferably formed by injection molding from a plastic material. A pair of endless circulating paths is defined in the main body, and these paths are defined when the upper and lower blocks 4a and 4b are put together at their mating surfaces as shown in FIG. 3. Each of the endless circulating paths includes a load section 11a and a return section 11b and a pair of connecting sections (not shown) each connecting the corresponding ends of the load and return sections 11a and 11b. The load section 11a is defined by a pair of associated inner and outer guide grooves 1a' and 2a'. A plurality of balls 3 are provided in each of the pair of endless circulating paths and the balls 3 located in the load section 11a are interposed between the rail 2 and the frame 1 as fitted in the inner and outer guide grooves 1a' and 2a', thereby providing a rolling contact between the rail 2 and the slider 10. It it to be noted that, as the slider 10 slidingly moves along the rail 2, the balls 3 located in the load section 11a move into the return section 11b through one of the connecting sections (not shown), and the balls 3 in the return section 11b move into the load section 11a through the other of the connecting sections (not shown). In this manner, the balls 3 can move along the endless circulating path 11 indefinitely in either direction depending on the direction of movement of the slider 10 with respect to the rail 2.

As shown in FIG. 3, each of the upper and lower blocks 4a and 4b is formed with a ball-retaining ridge which projects slightly into the load section 11a. Thus, the balls 3 are properly maintained in the load section 11a, and, moreover, the balls 3 are prevented from slipping away from the endless circulating path 11 even if the slider 10 is disassembled from the rail 2. Such a structure is particularly advantageous because it will facilitate the assembly and disassembly of the present bearing assembly. Although the above-described embodiment uses balls 3 as the rolling members, the present invention is equally applicable to a linear motion rolling contact bearing assembly using rollers as the rolling members.

Figure 4:
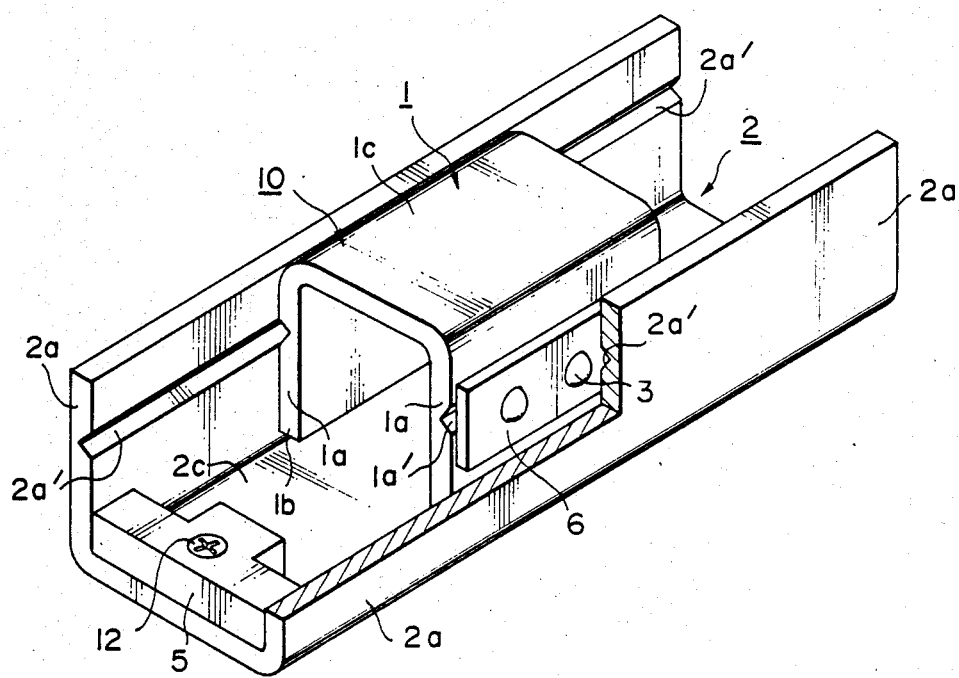
FIG. 4 is a perspective, partly cut-away view showing a linear motion rolling contact bearing assembly constructed in accordance with another embodiment of the present invention.
Figure 5:
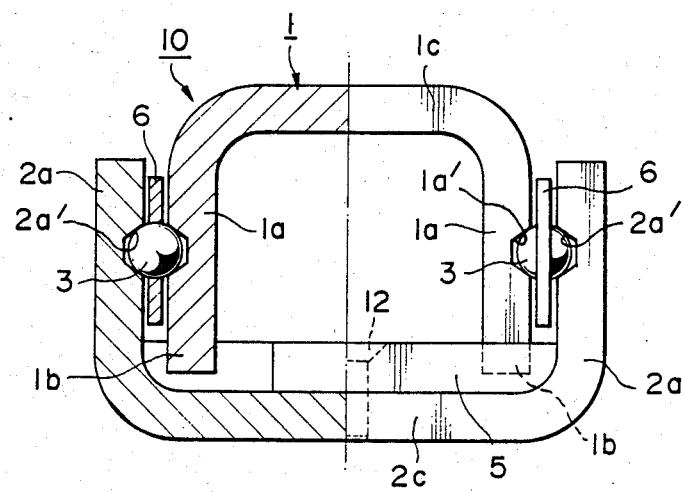
FIG. 5 is an end view showing partly in cross section the bearing assembly shown in FIG. 4.

FIG. 4 schematically shows a finite linear motion rolling contact bearing assembly constructed in accordance with another embodiment of the present invention. As shown, the bearing assembly includes a rail 2 comprised of a flat bottom wall 2c and a pair of upright side walls 2a, 2a extending upward from the opposite sides of the bottom wall 2c. Thus, the rail 2 has a U-shaped cross section. Preferably, the rail 2 is formed by bending a thin steel plate. A straight outer guide groove 2a' is formed at the inner surface of each of the side walls 2a, 2a and it extends in parallel with the longitudinal direction of the rail 2. The rail 2 further includes a stopper 5 provided at each end thereof, and the stopper 5 in this embodiment is comprised of a separate block which is fixedly attached to the bottom wall 2c of the rail 2 by means of a screw 12. Although only one such stopper block 5 is shown in FIG. 4, it should be understood that a similar stopper block is fixedly provided at the other end of the rail 2. In the present example, the stopper block 5 may be comprised of any desired material, such as a metal or a plastic material. A shock-absorbing effect may be provided if an elastic material is used to form the stopper block 5.

The bearing assembly of FIG. 4 further includes a slider 10 which is disposed inside of the trough-shaped space defined by the rail 2. The slider 10 includes a frame 1 which is comprised of a flat top wall 1c and a pair of side walls 1a, 1a depending straight downward from the opposite sides of the top wall 1c. An inner guide groove 1a' is formed at the outer surface of each of the pair of side walls 1a, 1a of the frame. A plurality of balls 3 are provided between the associated side walls 1a and 2a of the respective frame 1 and the rail 2 as partly fitted in the inner and outer guide grooves 1a' and 2a'. Also provided is a retainer plate 6 elongated in shaped and provided with a plurality of holes spaced apart from each other and each retaining therein the ball 3. Thus, the balls 3 provide a rolling contact between the rail 2 and the slider 10. In this embodiment, no endless circulating path is provided, and the balls 3 move rollingly only along the outer guide groove 2a'. Preferably, the frame 1 is formed from a thin steel plate by bending.

The side walls 1a, 1a of the frame 1 extend sufficiently downward so that the bottom ends 1b, 1b of the side walls 1a 1a come into engagement with the stopper block 5 when the slider 10 has moved to an extreme end of the rail 2, so that the slider 10 is suitably prevented from slipping away from the rail 2. Also in this case, since a stopper mechanism is provided between the U-shaped frame of the slider and the stopper member provided at the end of the rail, a stopping function is secure and reliable, and it can withstand a relatively large force. It should also be noted that the U-shaped frame 1 provides both of the bottom ends of its side walls engageable with the end stopper of the rail 2, which has a function of distributing the force acting between the frame 1 and the stopper 2b or 5.

Although the above-described embodiments use balls 3 as the rolling members, use may also be made of cylindrical rollers. In the case of the endless linear motion rolling contact bearing assembly shown in FIGS. 1 through 3, the rollers should be provided in a crossed arrangement, i.e., the rollers being arranged such that any two adjacent ones are oriented with their axes of rotation extending perpendicular to each other and also to the direction of movement along the endless circulating path.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly, comprising:
   a rail extending straight over a predetermined distance and including a bottom wall and a pair of outer side walls extending upward from opposite sides of the bottom wall, each of said pair of outer side walls being provided with an outer guide groove extending straight and in parallel with a longitudinal direction of said rail, said rail being provided with a stopper at each end thereof and said rail being integrally formed by bending a plate;
   a slider received in a space defined by said rail and including a frame having a top wall and a pair of inner side walls depending downward from opposite sides of the top wall, each of said pair of inner side walls being provided with an inner guide groove extending straight and in parallel with an associated one of said pair of outer guide grooves, each of said pair of inner side walls having a bottom end which is engageable with said stopper at each end of said rail, and said frame being integrally formed by bending a plate; and
   a plurality of rolling members interposed between said rail and said slider as partly fitted in said associated pair of inner and outer guide grooves.

2. The assembly of claim 1 wherein said stopper is integrally formed with said rail.

3. The assembly of claim 2 wherein said stopper is formed by bending an end portion of said bottom wall of said rail at each end thereof.

4. The assembly of claim 3 wherein said stopper is formed by bending said end portion generally at right angles to said bottom wall.

5. The assembly of claim 3 wherein said rail is comprised of a thin steel plate.

6. The assembly of claim 1 wherein said stopper is comprised of a separate block which is fixedly attached at said rail at each end thereof.

7. The assembly of claim 6 wherein said stopper block is fixedly attached to the bottom wall of said rail at each end thereof.

8. The assembly of claim 7 wherein said stopper block is fixedly attached to the bottom by means of a screw.

9. The assembly of claim 1 wherein said frame is comprised of a thin steel plate.

10. The assembly of claim 1 wherein said slider further includes a main body fixedly attached to said frame and provided with a pair of endless circulating paths, in which said plurality of rolling members are provided.

11. The assembly of claim 1 further comprising retaining means interposed between said rail and said slider for retaining said rolling members spaced apart from each other in a predetermined fashion.

* * * * *